US008734079B1

(12) United States Patent
Razumov (10) Patent No.: US 8,734,079 B1
(45) Date of Patent: May 27, 2014

(54) SELF-LIFTING ROBOTIC DEVICE WITH LOAD HANDLING MECHANISM

(71) Applicant: Sergey N. Razumov, Moscow (RU)

(72) Inventor: Sergey N. Razumov, Moscow (RU)

( * ) Notice: Subject to any disclaimer, the term of this patent is extended or adjusted under 35 U.S.C. 154(b) by 0 days.

(21) Appl. No.: 13/675,433

(22) Filed: Nov. 13, 2012

(51) Int. Cl.
*B65G 1/00* (2006.01)
*B65G 65/00* (2006.01)

(52) U.S. Cl.
USPC ............. 414/282; 414/331.14; 414/331.17; 414/471; 198/347.4; 198/463.3

(58) Field of Classification Search
USPC .......... 414/279, 281, 282, 283, 284, 331.14, 414/331.17, 471; 198/347.4, 463.3, 468.6; 108/144.11, 147.11; 700/214, 230; 701/19; 901/7
See application file for complete search history.

(56) References Cited

U.S. PATENT DOCUMENTS

| | | | | |
|---|---|---|---|---|
| 3,373,844 A * | 3/1968 | Schafer | | 182/141 |
| 4,273,494 A * | 6/1981 | Swain et al. | | 414/266 |
| 4,372,219 A * | 2/1983 | Gibbs | | 104/165 |
| 4,395,181 A * | 7/1983 | Loomer | | 414/284 |
| 4,657,463 A * | 4/1987 | Pipes | | 414/495 |
| 4,690,601 A * | 9/1987 | Delius et al. | | 414/795.3 |
| 4,856,956 A * | 8/1989 | Zur | | 414/280 |
| 5,139,384 A * | 8/1992 | Tuttobene | | 414/281 |
| 5,213,463 A * | 5/1993 | Rothlisberger et al. | | 414/280 |
| 5,433,293 A * | 7/1995 | Sager | | 187/249 |
| 5,501,295 A * | 3/1996 | Muller et al. | | 187/406 |
| 5,564,880 A * | 10/1996 | Lederer | | 414/280 |
| 5,609,220 A * | 3/1997 | Moriya et al. | | 180/253 |
| 5,658,120 A * | 8/1997 | Watanabe | | 414/495 |
| 5,829,948 A * | 11/1998 | Becklund | | 414/607 |
| 5,839,872 A * | 11/1998 | Goto et al. | | 414/280 |
| 5,839,876 A * | 11/1998 | McCarthy et al. | | 414/590 |
| 5,952,796 A * | 9/1999 | Colgate et al. | | 318/1 |
| 5,967,728 A * | 10/1999 | Gales et al. | | 414/284 |
| 6,112,858 A * | 9/2000 | Arnst | | 187/269 |
| 6,149,366 A * | 11/2000 | Deandrea | | 414/279 |
| 6,602,039 B1 * | 8/2003 | Dimitri et al. | | 414/281 |
| 6,889,813 B1 * | 5/2005 | Trammell et al. | | 198/346.3 |
| 6,929,440 B1 * | 8/2005 | Grond | | 414/284 |
| 7,128,521 B2 * | 10/2006 | Hansl | | 414/807 |
| 7,381,022 B1 * | 6/2008 | King | | 414/267 |
| 7,559,738 B2 * | 7/2009 | Salm et al. | | 414/799 |

(Continued)

FOREIGN PATENT DOCUMENTS

| | | |
|---|---|---|
| DE | 20206372 U1 | 8/2002 |
| DE | 202004002337 U1 | 5/2004 |
| JP | 2004-137023 A | 5/2004 |
| WO | 2014/009797 A1 | 1/2014 |

OTHER PUBLICATIONS

International Search Report issued in International Application No. PCT/IB2013/002495 mailed Jan. 31, 2014.

*Primary Examiner* — Douglas Hess
(74) *Attorney, Agent, or Firm* — McDermott Will & Emery LLP (57) ABSTRACT

A robotic device movable in a vertical direction between rails arranged in multiple rows at various levels with respect to ground. The robotic device has a frame, wheels coupled to the frame for moving the frame along the rails, and a movable platform provided on the frame. The platform is configured for moving the frame in a vertical direction between first rails and second rails arranged above the first rails, and for placing onto the robotic device first and second loads arranged at different levels with respect to the ground.

15 Claims, 9 Drawing Sheets

(56) References Cited

U.S. PATENT DOCUMENTS

| | | | |
|---|---|---|---|
| 7,591,630 B2 * | 9/2009 | Lert, Jr. | 414/807 |
| 7,753,637 B2 * | 7/2010 | Benedict et al. | 414/140.3 |
| 7,784,407 B2 * | 8/2010 | Di Rosa et al. | 104/48 |
| 7,787,985 B2 * | 8/2010 | Tsujimoto et al. | 700/214 |
| 7,837,424 B2 * | 11/2010 | Solomon | 414/331.04 |
| 7,871,232 B2 * | 1/2011 | Lutz | 414/279 |
| 7,959,396 B2 * | 6/2011 | Izumi | 414/279 |
| 8,105,005 B2 * | 1/2012 | Yoshida et al. | 414/282 |
| 8,403,614 B2 * | 3/2013 | Bastian et al. | 414/282 |
| 8,527,153 B2 * | 9/2013 | Doan | 701/49 |
| 2007/0071585 A1 * | 3/2007 | Henkel | |

\* cited by examiner

SELF-LIFTING ROBOTIC DEVICE WITH LOAD HANDLING MECHANISM

TECHNICAL FIELD

This disclosure relates to robotics, and more particularly, to a self-lifting robotic device capable of handling loads while moving in a vertical direction without assistance of external lifts.

BACKGROUND ART

Storage or warehouse systems may include multi-level storage racks for storing loads, such as boxes, containers or pallets, at each of the multiple levels. Access to the stored loads may be provided by a shuttle system including multiple remotely controlled robotic devices or shuttles arranged on each level. The shuttles move back and forth in a single horizontal direction within one storage level to access stored goods arranged on the corresponding level and carry them.

A lifting mechanism, such as a forklift, is provided to move loads in a vertical direction from the ground to the respective level of the storage rack or from the respective level to the ground. The forklift lifts newly arriving goods to the respective level and loads them to the shuttles that deliver the goods to required storage cells at that level. Similarly, shuttles retrieve goods from the storage cells and deliver them to the forklift raised to the respective level. The forklift unloads the goods from the shuttles and moves them in a vertical direction down to the ground.

However, the number of lifts in any efficient storage system employing multiple shuttles is substantially less than the number of shuttles. Therefore, "bottlenecks" are created near the lifts, reducing the throughput of the storage system.

Therefore, there is a need for a new "self-lifting" technique that would enable a robotic device, such as a shuttle, to move in a vertical direction without assistance of an external lift.

Moreover, it would be desirable to provide a self-lifting robotic device capable of carrying loads, while it moves in a vertical direction. Such self-lifting devices would substantially increase the throughput of the storage system because the loads can be carried from one end point of the storage system to another, without inteimmediate points where robotic devices are loaded and unloaded.

Also, to increase the throughput of the storage system, it would be desirable to provide a self-lifting robotic device with a single structural element allowing the robotic device to perform vertical movement and loading at the same time, so as to place loads onto the robotic device and carry them while the robotic device moves in a vertical direction.

SUMMARY OF THE DISCLOSURE

In accordance with one aspect, the present disclosure offers a robotic device movable in a vertical direction between rails arranged in multiple rows at various levels with respect to ground. The robotic device has a frame, wheels coupled to the frame for moving the frame along the rails, and a movable platform provided on the frame. The platform is configured for moving the frame in a vertical direction between first rails and second rails arranged above the first rails, and for placing onto the robotic device a first load arranged at a first level with respect to the ground, and a second load arranged at a second level with respect to the ground. The first level differs from the second level.

For example, the platform may carry support handles movable by the platform in a vertical direction with respect to the frame and configured for raising the frame with respect to the second rails when the support handles pushes against the second rails.

The robotic device may have a wheels turning mechanism for turning the wheels with respect to a direction of the second rails when the frame is raised with respect to the second rails.

The platform may also carry a grasping element movable by the platform in a horizontal direction with respect to the frame to take a load and place the load onto the platform.

The platform may enable the grasping element to take the first load when the wheels are placed on the first rails, and to take the second load when the wheels are placed on the second rails.

The platform may carry the first load while the platform is raised with respect to the frame to place the wheels on the second rails.

A holding element may be provided for holding the first load when the grasping element takes the second load and place the second load onto the platform.

The holding element may be extend from a sidewall of the robotic device.

For example, the first load may be arranged at a first side from the first rail, and the platform may enable enabling the grasping element to take a third load arranged at a second side from the first rail when the wheels are placed on the first rails.

The platform may enable the grasping element to take the first load when the platform is raised at a first vertical level with respect to the frame, and to enable the gripping element to take the third load when the platform is raised at a second vertical level with respect to the frame.

The platform may carry the first load when the platform is raised to take the third load.

In accordance with another aspect of the disclosure, a method is proposed for operating a robotic device movable in a vertical direction from first rails to second rails arranged at a different vertical level than the first rails, and having a frame, wheels coupled to the frame for moving the frame along the first and second rails, and a movable platform provided on the frame. The method involves placing a first load onto the platform. The platform with the first load is moved in a vertical direction with respect to the frame so as to provide engagement between the platform and the second rails. The platform may be moved at a distance greater than a distance between the first rails and the second rails. The frame is moved in the vertical direction by the platform. Thereafter, a second load is placed onto the platform, wherein the first and second loads are stored at different levels with respect to the ground before being placed onto the platform.

The wheels may be turned with respect to the direction of the second rails when the frame is moved in the vertical direction with respect to the second rails.

A grasping element arranged on the platform may be operated to take the first load and place the first load onto the platform.

A holding element attached on a sidewall of the robotic device may be operated to keep the first load by the holding element when the platform moves in the vertical direction with respect to the holding element, before the second load is placed onto the platform.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary embodiments described in the present disclosure. It will become apparent, however, that the concept of the disclosure is applicable to any robotic device movable in a vertical direction without an external lifting device.

Figure 1:
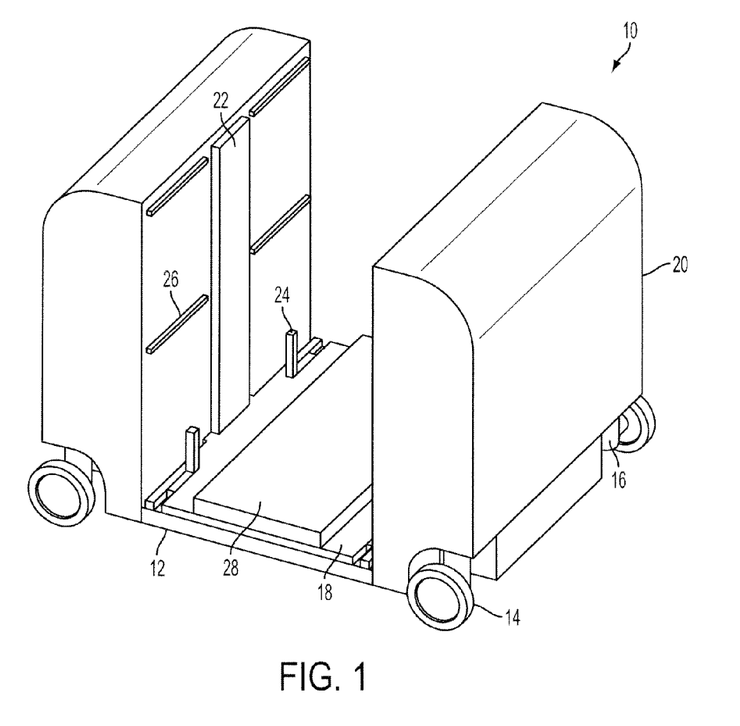
FIG. 1 shows an exemplary embodiment of a robotic device of the present disclosure.

FIG. 1 shows an exemplary embodiment of a robotic device 10 of the present disclosure. The robotic device 10 may operate in a storage system arranged in a warehouse or retail facility. The storage system may have rails arranged in multiple rows corresponding to multiple levels of the storage system. Each row may include horizontal rails enabling the robotic device to move in horizontal directions. For example, the robotic device 10 may be configured for moving along a pair of horizontal rails. Also, as discussed below, the robotic device 10 has a self-lifting mechanism enabling the robotic device 10 to move between rails in a vertical direction.

In accordance with an exemplary embodiment, the robotic device 10 have a frame 12 with four wheels 14 attached to the frame 12. The frame 12 may be formed as a braced structure for supporting elements required to operate the robotic device 10. Each wheel 14 may be attached to the frame 12 so as to rotate in a vertical plane about an axis extending from the center of the wheel 18 in order to move the robotic device 10 along the rails.

Four turning elements 16, such as vertical pivots, may be used for attaching the respective wheels 14 to the frame so as to turn each wheel 16 at a required angle. In particular, the wheel 14 may be turned in a horizontal plane about the vertical axis of the respective turning element 16. For example, each wheel 14 may be turned in a horizontal plane about 90 degrees with respect to the direction of a rail. Also, the turning elements 16 may be configured for turning the wheels 14 in a plane different from the horizontal plane. Each turning element 16 is arranged with respect to the frame 12 so as to make the width of the robotic device 10 with the wheels 14, smaller than a distance between adjacent rails in a direction perpendicular to the direction of the rails, when the wheels 14 are turned into the direction perpendicular to the direction of the rails.

As discussed below, the wheels 14 may be turned in a horizontal plane to support moving the robotic device 10 in the vertical direction, and to support turning the robotic device 10 to a horizontal direction perpendicular to a current horizontal direction of the robotic device 10. Although in an exemplary embodiment, the robotic device 10 has four wheels 14, one skilled in the art would realize that the present concept is applicable to any number of wheels that can be provided to support movement of the robotic device 10.

The frame 12 may hold a movable platform 18 that can be used for carrying loads, such as boxes, pallets and containers, delivered by the robotic device 10 in a storage system in a warehouse or retail environment. For example, the platform 18 may be a rectangular metal plate configured to accommodate boxes, pallets and containers with goods. Side walls 20 may be provided on the frame 16 to support loading and carrying goods.

As discussed below, the platform 18 may be moved in a vertical direction to support vertical movements of the robotic device 10. Platform lifting mechanisms 22 may be arranged on the respective side walls 20 for moving the platform 18 up or down in a vertical direction. For example, each platform lifting mechanism 22 may be implemented using a belt drive.

Deployable support handles 24 may be attached to the platform 18. FIG. 1 shows the support handles 24 held in an undeployed state in slots formed on the platform 18. The support handles 24 may be L-shaped pins extended from the platform 18 to support moving the robotic device 10 in a vertical direction.

Each side wall 20 may support a pair of holding elements 26 deployable for holding additional loads when the robotic device 10 moves. Ability of the robotic device to carry additional loads substantially increases the throughput and efficiency of the storage system. The holding elements 26 may be flat shelves or pins extendable in a horizontal direction from the side wall 20. FIG. 1 shows flat shelves 26 arranged in a non-deployed state in slots formed in the side wall 20. As shown below, the flat shelves 26 are extended from the side walls 20 during loading operations.

The platform 18 supports a grasping element 28 configured for handling loads, for example, for taking loads from a storage rack and placing them onto the robotic device 10. The grasping element 28 may be extended in a horizontal direction from any side of the robotic device 10 so as to take a load arranged at the respective side and place it onto the robotic device 10, or to unload goods from the robotic device 10 to a storage rack arranged at the respective side. For example, the grasping element 28 may be implemented as a metal plate, spade or fork.

Figure 2:
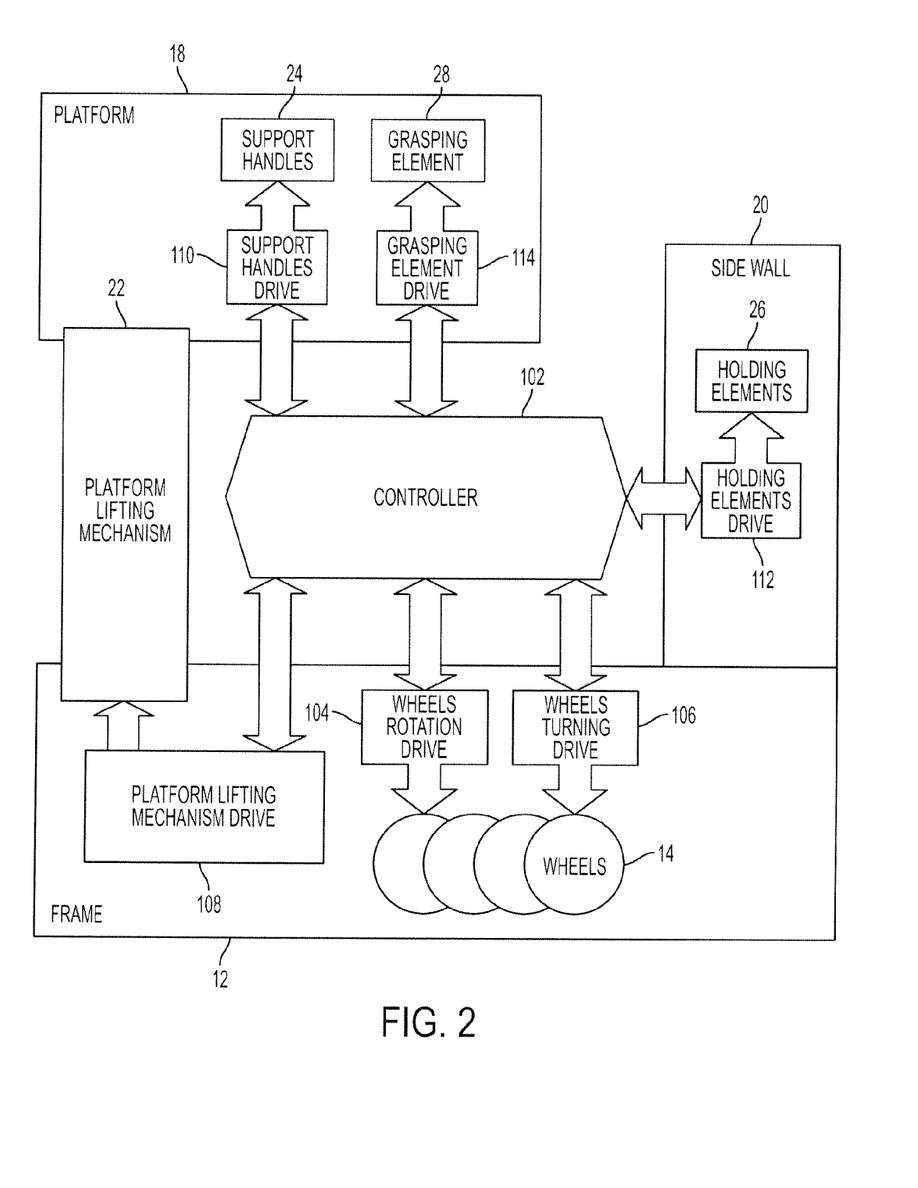
FIG. 2 is a simplified exemplary diagram showing elements for providing operation of the robotic device in FIG. 1.

FIG. 2 is a simplified diagram that illustrates elements for supporting various operations performed by the robotic device 10. The operations of the robotic device 10 are controlled by a controller 102 that may include a data processor responsive to external commands for processing the commands and producing various control signals. The controller may have a radio transceiver for providing bidirectional data communications with external objects via a radio network, such as a WiFi network. A controller area network (CAN) bus may connect the controller 102 with various elements of the robotic device 10 to supply control signals to the elements of the robotic device 10 and receive responses.

In particular, the controller 102 may control a wheels rotation drive 104, a wheels turning drive 106, a platform lifting mechanisms drive 108, a support handles drive 110, holding elements drives 112, and a grasping element drive 114. The wheels rotation drive 104, wheels turning drive 106 and platform lifting mechanisms drive 108 may be arranged on the frame 12, whereas the support handles drive 110 and the grasping element drive 114 may be arranged on the movable platform 18. The holding elements drives 112 may be provided on the side walls 20.

The wheels rotation drive 104 is provided for driving the wheels 14 so as to rotate them in a vertical plane in order to move the robotic device 10 along the rails in a horizontal direction. The wheels turning drive 106 drives the turning elements 16, such as pivots, so as to turn the respective wheels 14 in a horizontal plane. The wheels 14 may be turned 90 degrees about the vertical axes of the pivots 16. As one skilled in the art would realize, the wheels drives 104 and 106 may be implemented using any of well known mechanisms for rotating and turning wheels.

The platform lifting mechanisms drive 108 is provided for driving the platform lifting mechanisms 22 that move the platform 18 up and down in a vertical direction. As one skilled in the art would realize, the platform lifting mechanisms 22 and drive 108 may be implemented using any well known mechanisms for moving a plate up and down. For example, telescopic mechanisms can be utilized.

The support handles drive 110 is used for extending the support handles 24 from the slots on the platform 18 when the support handles 28 are required for supporting movements of the robotic device 10, and for hiding the support handles 24 back into the slots on the platform 22 when the support handles 24 are no longer required. The drive 110 may be implemented using any well known mechanism for extending a pin.

The holding elements drive 112 is provided for extending the holding elements 26, such as shelves, from the respective side wall 20 when the holding elements are required for holding loads. The holding elements drive 112 hides the holding elements 26 into the side wall 20 when they are not required. The holding elements drive 112 that causes the holding elements 26 to perform a linear motion while extending from the sidewall 20, may be implemented using well known linear motion mechanisms such as a ball screw transmission mechanism, belt or chain drives. Alternatively, the holding elements 26 may be turned with respect to the sidewall 20. In this case, turning mechanisms, such as reduction gear or link mechanism, may be used as the holding elements drive 112.

The grasping element drive 114 is provided for extending the grasping element 28 from a desired side of the robotic device 10 so as to enable the grasping element 28 to operate with a load. For example, the grasping element drive 114 may be implemented using a telescopic linear actuator.

Figure 3:
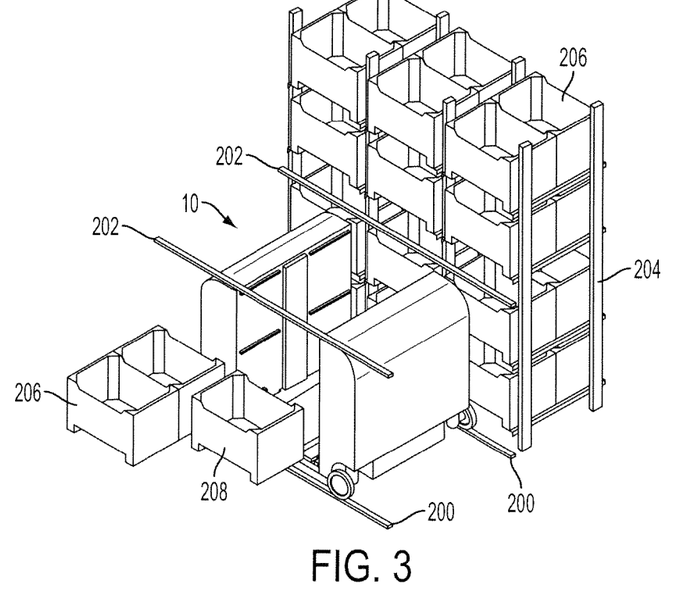
FIGS. 3-6 illustrate exemplary loading operations performed by the robotic device in a storage facility.

FIGS. 3-6 illustrate exemplary loading operations performed by the robotic device 10 in a storage facility. In particular, FIG. 3 shows the robotic device 10 standing on a pair of rails 200 extending in a horizontal direction. Also, FIG. 3 shows a pair of horizontal rails 202 arranged in a storage facility above the rails 200.

In an exemplary embodiment of the present disclosure, the storage facility may have multiple storage racks 204 for storing boxes 206 arranged in multiple horizontal rows and multiple vertical columns. Pairs of horizontal rails 200 and 202 may be provided at different vertical levels of the storage facility so as to provide the robotic device 10 with access to boxes 206 arranged at the corresponding levels of the storage facility from both sides of the pairs of rails 200 and 202. For example, FIG. 3 shows two boxes 206 arranged in each vertical column between the rails 200 and 202.

Also, FIG. 3 shows a box 208 representing one of the boxes 206 being loaded by the robotic device 10. In particular, in order to load the box 208, the controller 102 controls the wheels rotation drive 104 to rotate the wheels 14 along the rails 200 so as to position the robotic device 10 with respect to the box 208.

Figure 4:
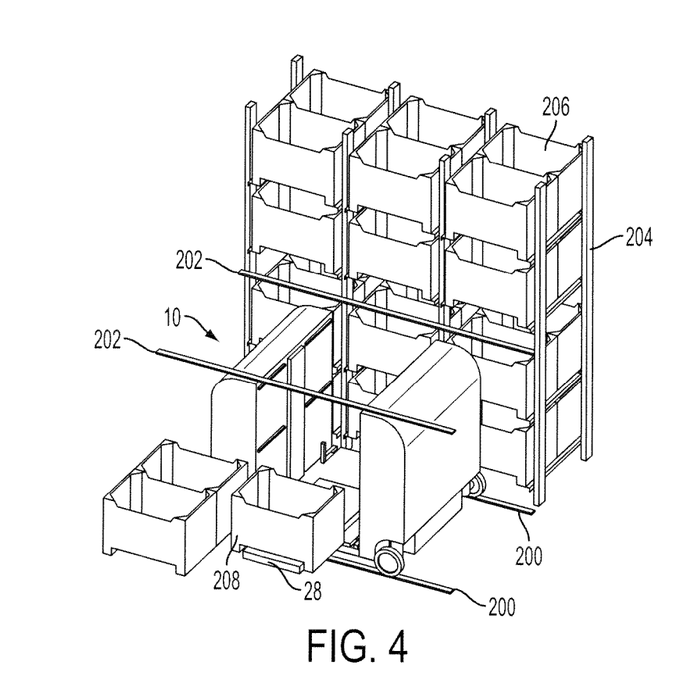

Then, as shown in FIG. 4, the controller 102 controls the platform lifting mechanism drive 108 to cause the platform lifting mechanism 22 to move the platform 18 in a vertical direction so as to lift the platform 18 with respect to the frame 12 at a level required to grasp the box 208. Thereafter, the controller 102 controls the grasping element drive 114 to extend the grasping element 28 from the platform 18 in a horizontal direction so as to position the grasping element 28 under the box 208. For example, as shown in FIG. 4, the box 208 may have a recess at the bottom provided to enable the grasping element 28 to penetrate under the box 208.

The platform 18 is lifted again to allow the grasping element 28 to take the box 208. Thereafter, the grasping element 28 is controlled to return into its original non-extended position. As a result, the grasping element 28 move the box 208 and place it on the platform 18.

Figure 5:
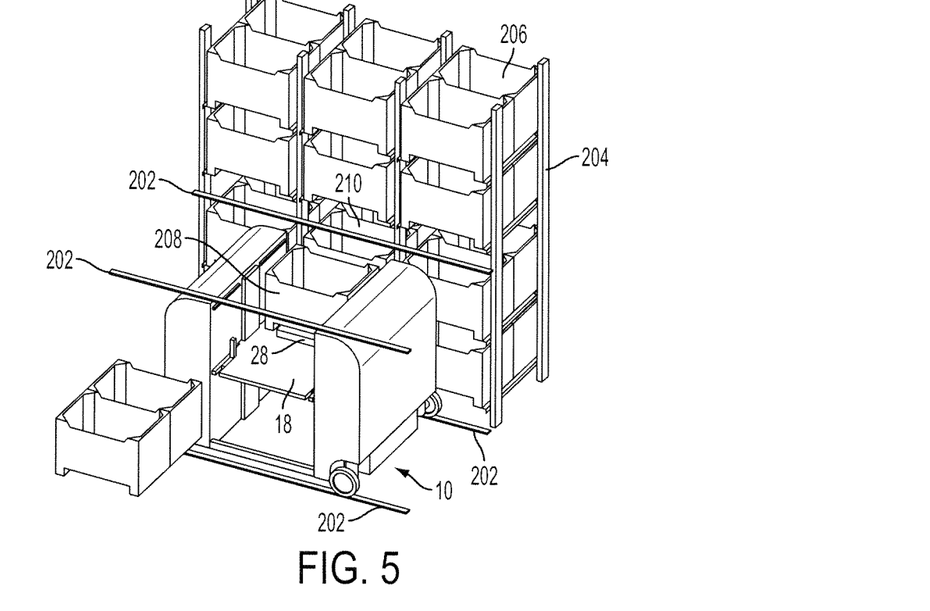

FIG. 5 illustrates that the robotic device 10 can hold the box 208 and load another box 210, for example, stored on the storage rack 204 arranged from opposite side of the pair of rails 200 with respect to the storage position of the box 208. The boxes 208 and 210 may be arranged at different levels with respect to the ground. For example, the storage position of the box 210 may be above the storage position of the box 208. To load the box 210, the controller 102 controls the controls the wheels rotation drive 104 to rotate the wheels 14 along the rails 200 so as to position the robotic device 10 with respect to the box 210. Then, the platform 28 is lifted to position it at a vertical level corresponding to the storage position of the box 210. Thereafter, the grasping element 28 is extended in a horizontal direction so as to position the grasping element 28 under the box 210.

Figure 6:
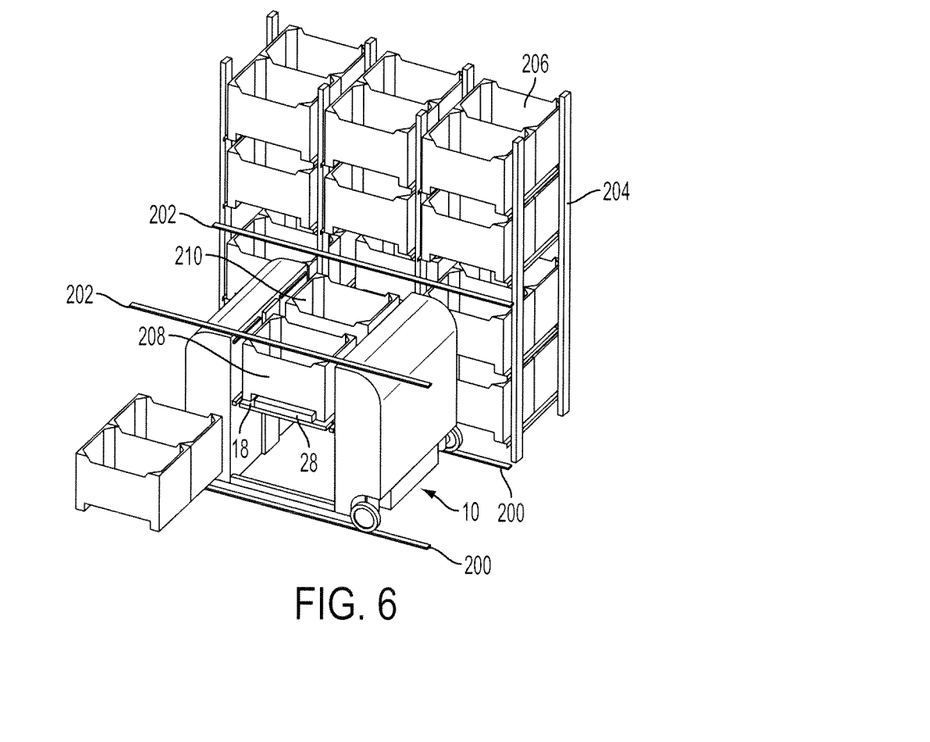

As shown in FIG. 6, the platform 18 is lifted to enable the grasping element 28 to take the box 210. Then, the grasping element 28 is controlled to move the box 210 and place it on the platform 28 near the box 208. As discussed below, the robotic device 10 is able to hold both boxes 208 and 210, and move in vertical and horizontal directions.

Figure 7:
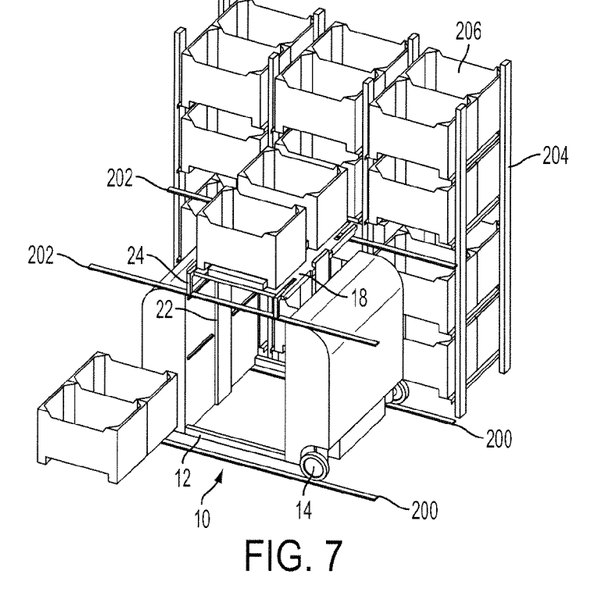
FIGS. 7-10 illustrate exemplary operations performed by the robotic device when it carries loads and moves in a vertical direction

FIGS. 7-10 illustrate exemplary operations performed by the robotic device 10 when it carries the boxes 208 and 210 and moves in a vertical direction from the rails 200 to the rails 202. In particular, as shown in FIG. 7, to enable the robotic device 10 to move in a vertical direction, the controller 102 controls the platform lifting mechanisms drive 108 to cause the platform lifting mechanisms 22 on both side walls 20 to raise the platform 18 with respect to the frame 12 in a vertical direction above the level of the rails 202. The platform 18 is raised together with the boxes 208 and 210 held on the platform 18.

After the platform 18 is raised above the level of the rails 202, or simultaneously with raising the platform 18, the support handles drive 110 is controlled to deploy the support handles 24. The deployment of the support handles 24 may be provided by extending each of them from the respective slot on the platform 18 to a position directly above the respective rail 202.

For example, each support handle 24 may be implemented as an L-shaped support pin 24 shown in FIGS. 7-10. During the deployment, the support pin 24 may be extended and placed directly above the respective rail 202. Thereafter, the platform 18 is lowered to a lower position so as to engage each support pin 24 with the respective rail 202 and raise the frame 12 with respect to the rails 200 by pushing the support pins 24 against the rails 202. The frame 12 is raised to a level sufficient to disengage the wheels 14 from the rails 200.

Figure 8:
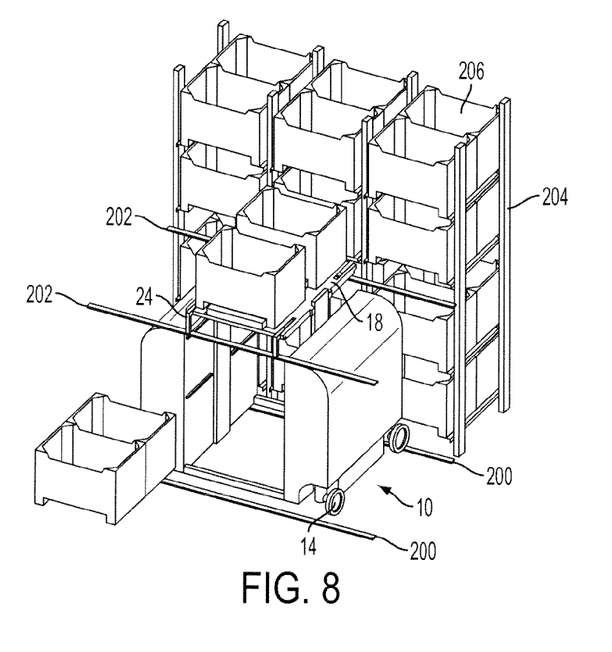

As shown in FIG. 8, when the wheels 14 become disengaged from the rails 200, the wheels turning drive 106 is controlled so as to turn each of the wheels 14 in a horizontal plane using the respective turning elements 16. For example, each wheel 14 may be turned about the vertical axis of the turning element 16 by an angle equal to approximately 90 degrees. The position of the turning element 16 with respect to the frame 12 is selected so as to provide the maximum distance between the edges of the turned wheels 14 in a direction perpendicular to the direction of the rails 200, smaller than the distance between the rails in the horizontal direction.

Figure 9:
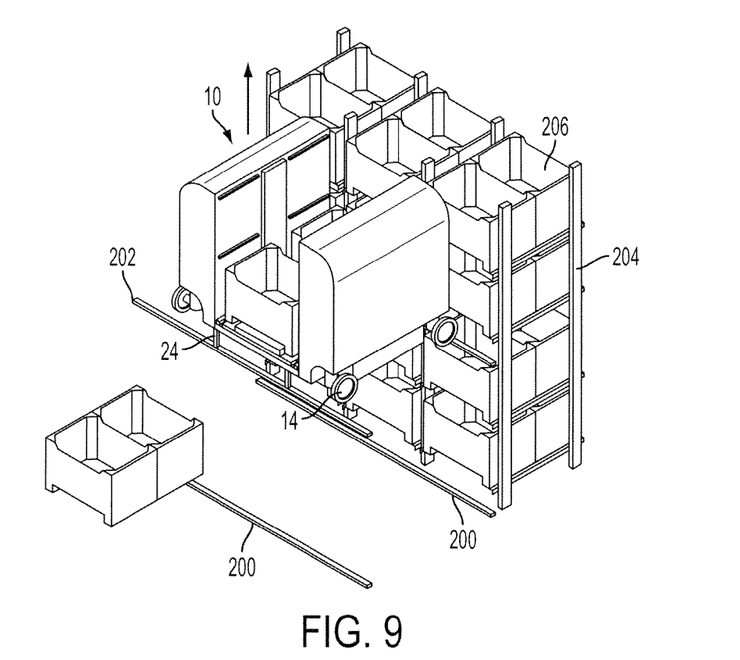

As shown in FIG. 9, the support handles 24 fix the platform 18 on the rail 202 so as to enable the platform lifting mechanisms 22 to lift the frame 12 so as to reduce the distance between the platform 18 and the frame 12 in a vertical direction. The frame 12 may be lifted to a level above the rails 202 so as to place the platform 18 carrying the boxes on the frame 12. As the distance between the edges of the turned wheels 14 is less than the distance between the rails 202 in a direction perpendicular to the direction of the rails 202, the frame 12 with the wheels 14 can be transferred in the space between a pair of the horizontal rails 202.

Figure 10:
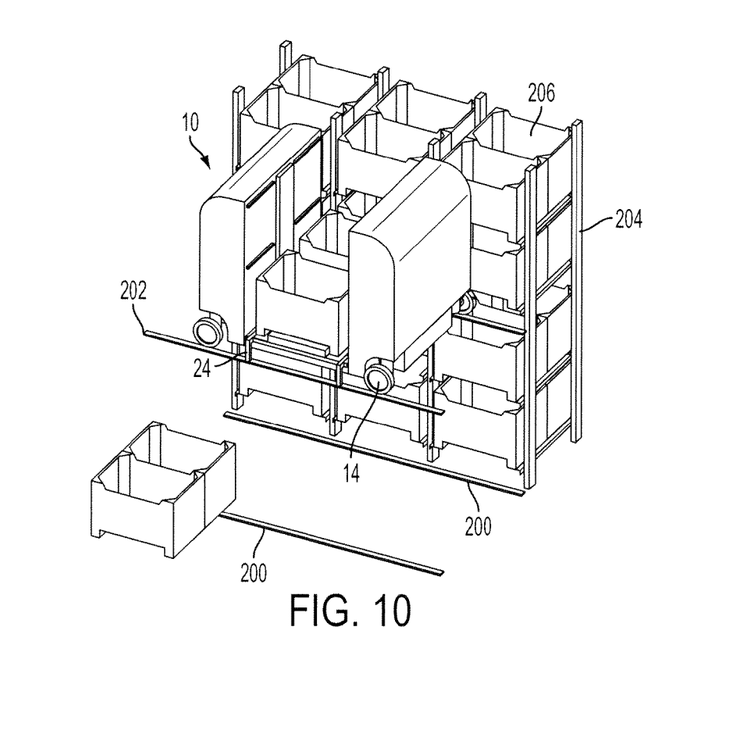

As shown in FIG. 10, when the frame 12 is raised to a desired position above the rails 202, the wheel turning drive 106 is controlled to turn the wheels 14 using the respective turning elements 16 so as to return each wheel 14 to an initial position along the rails. Thereafter, the frame 12 is lowered so as to place the wheels 14 on the rails 202, and the support handles 24 may be removed from the rails 202 and placed into the respective slots on the platform 18.

Hence, the robotic device 10 standing on lower rails 200 and holding the loads can lift itself in a vertical direction to a level of higher rails 202 in the next row of rails so as to continue movement along the rails 202. As one skilled in the art would realize, a similar technique can be used to move the robotic device 10 with the load down in a vertical direction from higher rails 202 to lower rails 200 in the next row of the rails. No external lifting device is required for moving the robotic device up or down in a vertical direction.

Figure 11:
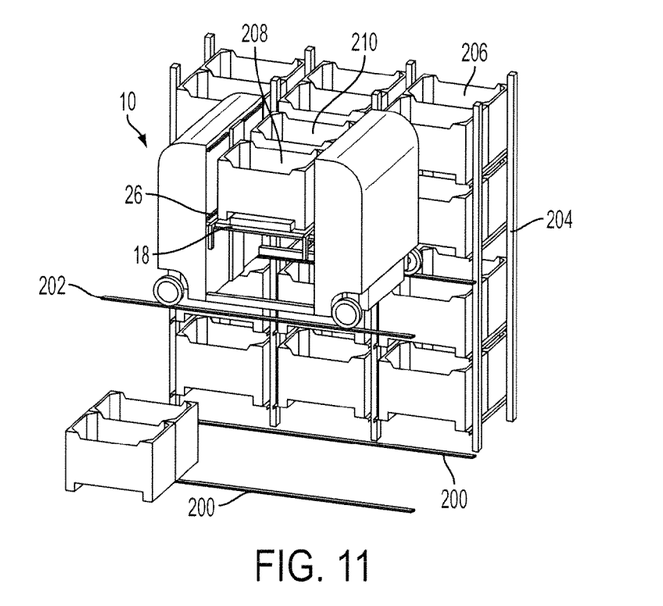
FIGS. 11-13 illustrate exemplary operations performed by the robotic device to place the loads onto holding elements.
Figure 12:
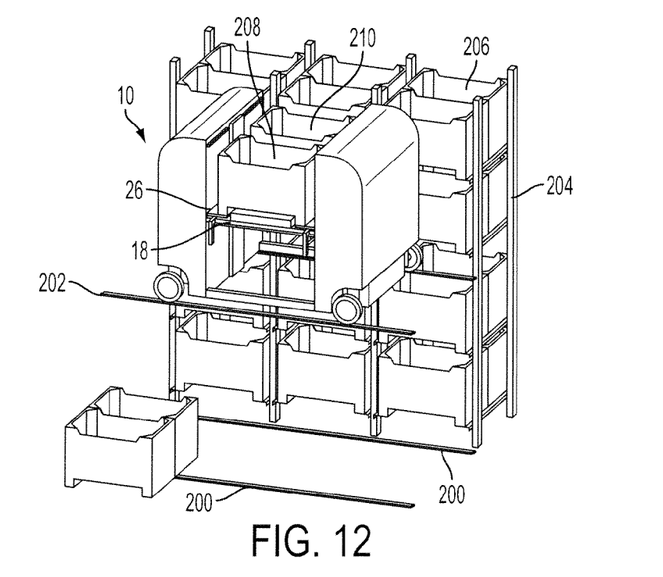
Figure 13:
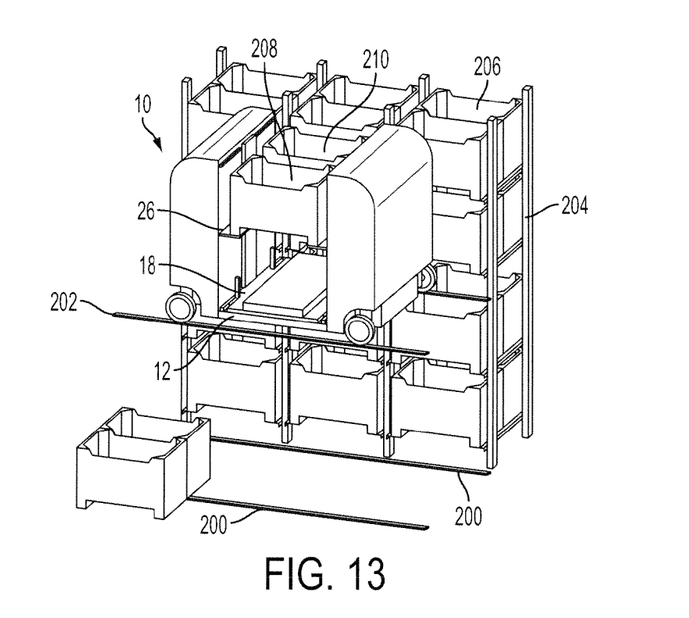

FIGS. 11-13 illustrate exemplary operations performed by the robotic device 10 to place the loads onto the holding elements 26. In particular, as shown in FIG. 11, the platform 18 with the boxes 208 and 210 may be lifted by the platform lifting mechanism 22 to a level above the level at which the holding elements 26 are positioned in the side walls 20. Thereafter, as shown in FIG. 12, the holding elements 26 are extended from the side walls 20 by the holding element drive 112. The size of the holding elements 26 is selected so as to keep the boxes 208 and 210 positioned on the platform 18 when the platform 18 moves down.

As shown in FIG. 13, the platform 18 may be moved down to the level of the frame 12. When the platform 18 moves below the holding elements 26, the boxes 208 and 210 are kept by the holding elements 26. When the boxes 208 and 210 are removed from the platform 18, the grasping element 28 is released and can be used for loading additional boxes.

Figure 14:
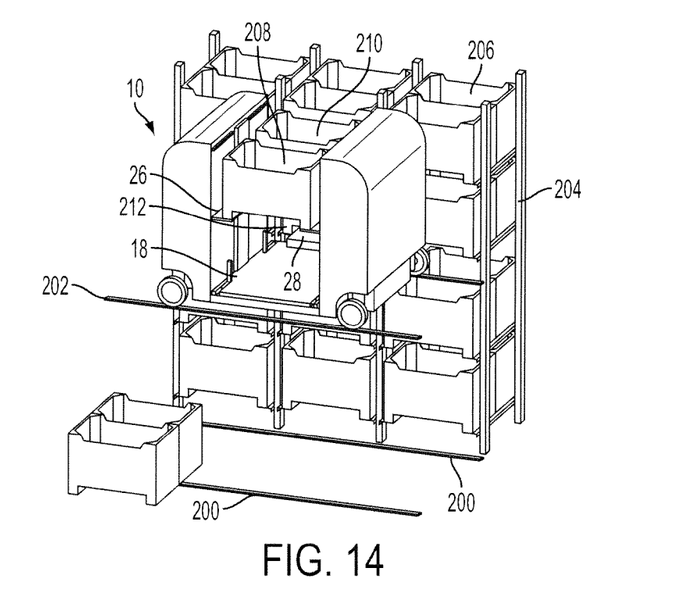
FIGS. 14 and 15 illustrate exemplary operations performed by the robotic device to load additional boxes while other boxes are held by the holding elements.
Figure 15:
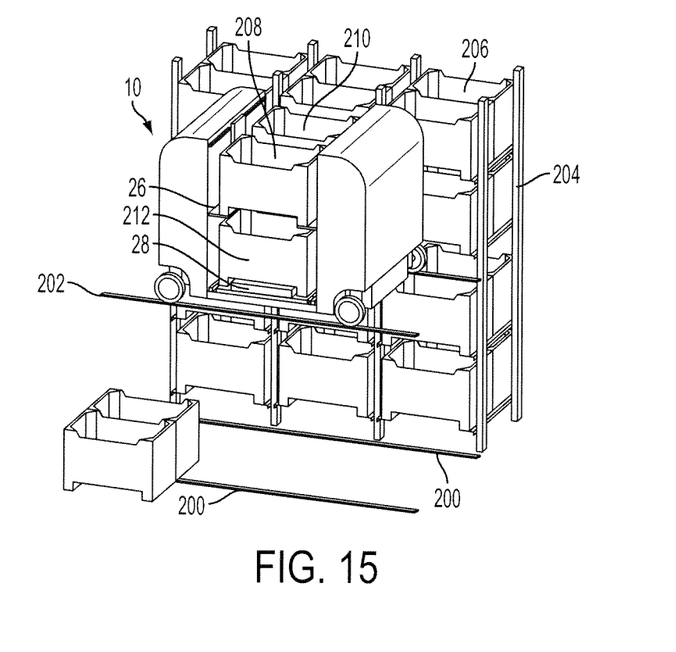

FIGS. 14 and 15 illustrate exemplary operations performed by the robotic device 10 to load additional boxes while the boxes 208 and 210 are held by the holding elements 26. For example, as shown in FIG. 14, to load an additional box 212, the platform 18 may be raised to a level selected so as to enable the grasping element 28 to take the box 212. Thereafter, the grasping element drive 114 extends the grasping element 28 in the direction of the box 212 to place the grasping element 28 under the box 212. The platform 18 is raised to allow the grasping element 28 to take the box 212 from the rack 204. As shown in FIG. 15, the grasping element 28 is moved back to the platform 18 so as to place the box 212 onto the platform 18.

As a result, the robotic device 10 is able to move in horizontal and vertical directions with boxes 208 and 210 held by the holding elements 26, and additional boxes carried by the platform 18. Although FIGS. 14 and 15 illustrate loading only one additional box 212 onto the platform, one skilled in the art would realize that any number of boxes can be placed onto the platform while other boxes are held by the holding elements 26.

Figure 16:
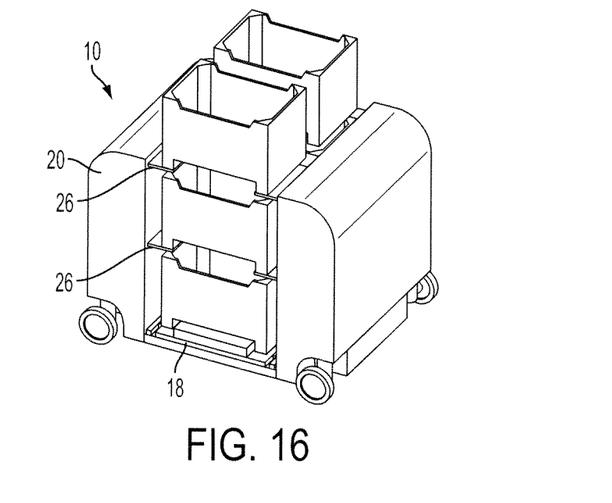
FIG. 16 illustrates the robotic device carrying loads arranged in multiple rows.

Moreover, as illustrated in FIG. 16, the side walls 20 may contain multiple rows of holding elements 26 at various horizontal levels. The robotic device 10 in FIG. 16 is capable of carrying multiple rows of boxes held by the multiple rows of the holding elements and by the platform 18. Although FIG. 16 shows two boxes in each of three rows of boxes, one skilled in the art would realize that the robotic device 10 of the present disclosure is able to move in horizontal and vertical directions while carrying any desired number of boxes in any desired number of rows.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A robotic device for carrying loads and movable in a vertical direction between rails arranged in multiple rows at various levels with respect to ground, the robotic device comprising:
   a frame,
   wheels coupled to the frame for moving the frame along the rails, and
   a movable platform provided on the frame, the platform being configured for moving with respect to the frame to move the frame in a vertical direction between first rails and second rails arranged above the first rails, and for placing onto the robotic device a first load arranged at a first level with respect to the ground, and a second load arranged at a second level with respect to the ground,
   wherein the platform is configured for carrying support handles movable by the platform in a vertical direction with respect to the frame and configured for raising the frame with respect to the second rails when the support handles push against the second rails.

2. The device of claim 1, further comprising a wheels turning mechanism for turning the wheels with respect to a direction of the second rails when the frame is raised with respect to the second rails.

3. The device of claim 2, wherein the platform is further configured for carrying a grasping element movable by the platform in a horizontal direction with respect to the frame to take a load and place the load onto the platform.

4. The device of claim 3, wherein the platform is configured for enabling the grasping element to take the first load when the wheels are placed on the first rails, and for enabling the grasping element to take the second load when the wheels are placed on the second rails.

5. The device of claim 4, wherein the platform is configured to carry the first load while the platform is raised with respect to the frame to place the wheels on the second rails.

6. The device of claim 5, further comprising a holding element for holding the first load when the grasping element takes the second load and place the second load onto the platform.

7. The device of claim 6, further comprising a side wall, wherein the holding element is configured to extend from the sidewall.

8. The device of claim 7, wherein the first load is arranged at a first side from the first rail, and the platform is configured for enabling the grasping element to take a third load arranged at a second side from the first rail when the wheels are placed on the first rails.

9. The device of claim 8, wherein the platform is configured to enable the grasping element to take the first load when the platform is raised at a first vertical level with respect to the frame, and to enable the gripping element to take the third load when the platform is raised at a second vertical level with respect to the frame.

10. The device of claim 9, wherein the platform is configured to carry the first load when the platform is raised to take the third load.

11. A method of operating a robotic device movable in a vertical direction from first rails to second rails arranged at a different vertical level than the first rails, and having a frame, wheels coupled to the frame for moving the frame along the first and second rails, and a movable platform provided on the frame, the method comprising the steps of:
    placing a first load onto the platform,
    moving the platform with the first load in a vertical direction with respect to the frame so as to provide engagement between the platform and the second rails,
    moving the frame in the vertical direction by the platform, and
    placing a second load onto the platform,
    wherein the first and second loads are arranged at different levels with respect to the ground before being placed onto the platform.

12. The method of claim 11, further comprising the step of turning the wheels with respect to the direction of the second rails when the frame is moved in the vertical direction with respect to the second rails.

13. The method of claim 12, further comprising the step of operating a grasping element arranged on the platform to take the first load and place the first load onto the platform.

14. The method of claim 13, further comprising the step of operating a holding element to keep the first load by the holding element when the platform moves in the vertical direction with respect to the holding element, before the second load is placed onto the platform.

15. The method of claim 11, wherein the platform is moved in the vertical direction at a distance greater than a distance between the first rails and the second rails.

* * * * *